United States Patent
Chung et al.

(10) Patent No.: US 8,927,152 B2
(45) Date of Patent: Jan. 6, 2015

(54) BINDER FOR ELECTRODE OF LITHIUM RECHARGEABLE BATTERY AND ELECTRODE FOR RECHARGEABLE BATTERY COMPRISING THE SAME

(71) Applicant: Samsung SDI Co., Ltd., Yongin-si, Gyeonggi-do (KR)

(72) Inventors: Byungjoo Chung, Yongin-si (KR); Namseon Kim, Yuseong-gu (KR); Yangsoo Kim, Yuseong-gu (KR); Kwangshik Choi, Yuseong-gu (KR)

(73) Assignee: Samsung SDI Co., Ltd., Yongin-si (KR)

( * ) Notice: Subject to any disclaimer, the term of this patent is extended or adjusted under 35 U.S.C. 154(b) by 10 days.

(21) Appl. No.: 13/800,258

(22) Filed: Mar. 13, 2013

(65) Prior Publication Data
US 2014/0038047 A1    Feb. 6, 2014

(30) Foreign Application Priority Data

Aug. 1, 2012   (KR) .......................... 10-2012-0084509

(51) Int. Cl.
| | | |
|---|---|---|
| H01M 4/62 | (2006.01) | |
| H01M 4/38 | (2006.01) | |
| H01M 4/134 | (2010.01) | |
| H01M 10/052 | (2010.01) | |

(52) U.S. Cl.
CPC .............. *H01M 4/622* (2013.01); *H01M 4/134* (2013.01); *H01M 4/38* (2013.01); *H01L 10/052* (2013.01); *H01M 4/386* (2013.01)

USPC ................... 429/217; 526/307.6; 526/307.3; 252/182.1

(58) Field of Classification Search
None
See application file for complete search history.

(56) References Cited

U.S. PATENT DOCUMENTS

| | | | | |
|---|---|---|---|---|
| 5,428,000 | A | * | 6/1995 | Innami et al. ................. 504/104 |
| 5,643,490 | A | * | 7/1997 | Takahashi et al. ........... 252/62.2 |
| 2010/0216008 | A1 | | 8/2010 | Yoon |
| 2011/0135976 | A1 | | 6/2011 | Byun |
| 2011/0183193 | A1 | | 7/2011 | Byun et al. |

FOREIGN PATENT DOCUMENTS

| | | |
|---|---|---|
| KR | 1997-0074804 | 12/1997 |
| KR | 10-2008-0062642 A | 7/2008 |
| KR | 10-2011-0065277 A | 6/2011 |
| KR | 10-1042808 B1 | 6/2011 |
| KR | 10-2010-0097402 | 9/2012 |

* cited by examiner

*Primary Examiner* — Patrick Ryan
*Assistant Examiner* — Christopher Domone
(74) *Attorney, Agent, or Firm* — Christie, Parker & Hale, LLP

(57) ABSTRACT

Provided is a binder for an electrode of a lithium rechargeable battery including a copolymer of Chemical Formula 1, which increases adhesion between the electrode and an active material by employing a copolymer based on polyacrylamide, while having excellent heat resistance and mechanical strength, an electrode for a rechargeable battery including the same, and a rechargeable battery including the electrode. The binder and electrode can improve charge and discharge cycle life characteristics of the rechargeable battery.

[Chemical Formula 1]
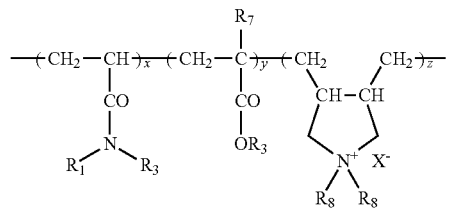
20 Claims, 1 Drawing Sheet

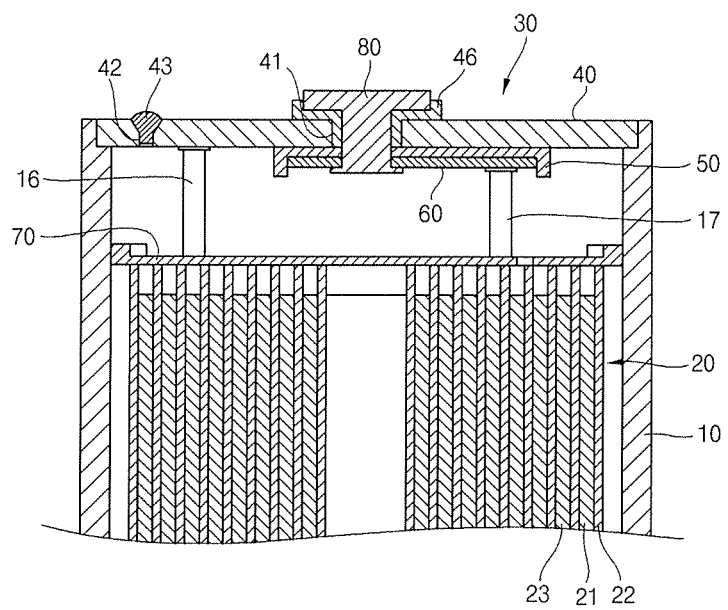

BINDER FOR ELECTRODE OF LITHIUM RECHARGEABLE BATTERY AND ELECTRODE FOR RECHARGEABLE BATTERY COMPRISING THE SAME

CROSS-REFERENCE TO RELATED APPLICATION

This application claims priority to and the benefit of Korean Patent Application No. 10-2012-0084509, filed in the Korean Intellectual Property Office on Aug. 1, 2012, the entire content of which is incorporated herein by reference.

BACKGROUND

1. Field

Embodiments of the present invention relate to a binder for an electrode of a lithium rechargeable battery and an electrode for a rechargeable battery including the same, and more particularly, to a binder for an electrode of a lithium rechargeable battery, which increases adhesion between the electrode and an active material by employing a copolymer based on polyacrylamide.

2. Description of the Related Art

As application areas of rechargeable batteries are gradually increasing from small electronic devices to electric automobiles or power storage, there is increasing demand for positive electrode materials for use in rechargeable batteries having various advantageous characteristics, including high safety, extended cycle life, high energy density and high output characteristic.

Accordingly, research to diversify electrode active materials has been made. However, since existing binders, such as styrene butadiene rubber/carboxymethyl cellulose (SBR/CMC), have very low adhesion with respect to an active material, there is a limitation in using the same in a wide variety of applications for new active materials. In addition, existing binders may often adversely affect battery characteristics after repeated charge and discharge cycles. In particular, in case of active materials expanding to approximately 300% of their original size, due to characteristics of a metal of the active material, with repeated charge and discharge cycles, such as Si-based active materials, there is a limitation in using the existing binder. In addition, when the existing binder is used, charge and discharge characteristics may noticeably degrade.

SUMMARY

Aspects of embodiments of the present invention are directed toward a binder for an electrode of a lithium rechargeable battery, which can exhibit high adhesion even when used with an electrode active material for a high-capacity battery, thereby providing excellent charge and discharge cycle life characteristics. Aspects of embodiments of the present invention are also directed toward a binder for an electrode of a lithium rechargeable battery and an electrode for a rechargeable battery including the same, the binder having excellent heat resistance and mechanical strength.

According to an embodiment of the present invention, a binder for an electrode of a lithium rechargeable battery is provided, the binder including binder for an electrode of a rechargeable battery comprising a copolymer of Chemical Formula 1:

[Chemical Formula 1]

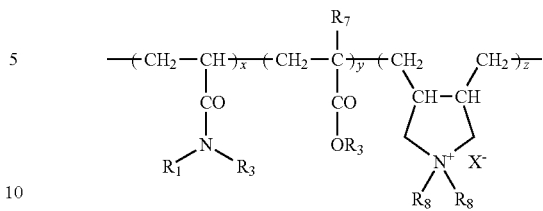

wherein $R_1$ and $R_2$ are each independently H, a substituted or unsubstituted C1-C10 alkyl group, a substituted or unsubstituted C1-C10 alkenyl group, a C5-C20 aryl group, and a C1-C10 alkylalcohol group; $R_3$ is H, a substituted or unsubstituted C1-C10 alkylcarboxylic group, its inorganic ion salt, or $-R_4NR_5R_6$, where $R_4$ is a substituted or unsubstituted C1-C10 alkylene group, or a substituted or unsubstituted C2-C20 alkenylene group; $R_5$ and $R_6$ are each independently a substituted or unsubstituted C1-C10 alkyl group, or a substituted or unsubstituted C1-C10 alkenyl group, or a C5-C20 aryl group; $R_7$ is H or $CH_3$; $R_8$ is a substituted or unsubstituted C1-C3 alkyl group; and $X^-$ is an anionic counter ion, such as $OH^-$, $Cl^-$ or $Br^-$.

x and (y+z) may be in a range of 95-60 wt % and in a range of 40-5 wt %, respectively, and a ratio of y to z may be in a range of 100:0 to 0:100.

According to another embodiment of the present invention, there is provided an electrode for a rechargeable battery using the binder.

As described above, the binder according to the present invention has improved adhesion by being combined with a polyacrylamide based copolymer, that is, acrylate copolymer having excellent heat resistance and mechanical strength and high surface adhesion.

Therefore, the rechargeable battery including an electrode employing the binder according to the present invention demonstrates good charge and discharge cycle life characteristics.

Additional aspects and/or advantages of the invention will be set forth in part in the description which follows and, in part, will be obvious from the description, or may be learned by practice of the invention.

BRIEF DESCRIPTION OF THE DRAWING

The objects, features and advantages of the present invention will be more apparent from the following detailed description in conjunction with the accompanying drawing.

Here, the accompanying drawing is a partially cross-sectional view of a lithium rechargeable battery according to an embodiment of the present invention.

DETAILED DESCRIPTION

Hereinafter, embodiments of the present invention will be described in more detail with reference to the accompanying drawing. Only certain exemplary embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements inter-

<Binder>

According to embodiments of the present invention, the binder for an electrode of a rechargeable battery includes a polymer of Chemical Formula 1:

[Chemical Formula 1]

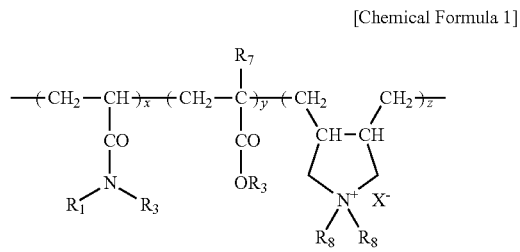

wherein $R_1$ and $R_2$ are each independently H, a substituted or unsubstituted C1-C10 alkyl group, a substituted or unsubstituted C1-C10 alkenyl group, a C5-C20 aryl group, and a C1-C10 alkylalcohol group; $R_3$ is H, a substituted or unsubstituted C1-C10 alkylcarboxylic group, its inorganic ion salt, or $-R_4NR_5R_6$, where $R_4$ is a substituted or unsubstituted C1-C10 alkylene group, or a substituted or unsubstituted C2-C10 alkenylene group, $R_5$ and $R_6$ are each independently a substituted or unsubstituted C1-C10 alkyl group, or a substituted or unsubstituted C1-C10 alkenyl group, or a C5-C20 aryl group; $R_7$ is H or $CH_3$; $R_8$ is a substituted or unsubstituted C1-C3 alkyl group; and $X^-$ is an anionic counter ion, such as $OH^-$, $Cl^-$ or $Br^-$.

Here, in Chemical Formula 1, x and (y+z) are in a range of 95-60 wt % and in a range of 40-5 wt %, respectively, and a ratio of y to z is in a range 100:0 to 0:100, for example, 30:70 to 70:30.

In more detail, the binder according to embodiments of the present invention is a water-based binder that should have excellent adhesion to a current collector for use as a binder for a rechargeable battery. Therefore, in some embodiments, a monomer having an acid functional group (to be referred to as an acid monomer, hereinafter) and a monomer having a polymerizable cationic functional group in a polymer chain are to be used to form the binder (e.g., the water-based binder). Copolymerizing a polar monomer, such as an acid monomer, with an acryl polymer greatly changes adhesion performance, even when the acid monomer is used in a small amount, thereby greatly improving the adhesion strength. In addition, introducing a polymerizable cationic monomer to the polymer chain further increases adhesion to the current collector. Examples of suitable acid monomers may include (meth) acrylic acid, itaconic acid, fumaric acid, crotonic acid, maleic acid, monomethyl itaconate, methyl fumarate and monobutyl fumarate, which may be used alone or in a combination of two or more of these materials.

According to embodiments of the present invention, the acid functional group may be prepared as an inorganic ion salt of calcium (Ca), potassium (K), sodium (Na), magnesium (Mg) or lithium (Li). For example, a usable base is an inorganic base, and examples thereof may include alkali metal hydroxide, such as NaOH, KOH, or LiOH. Specifically, in some embodiments, LiOH is used.

In addition, examples of the cationic copolymer may include N,N-diethyl acrylamide (DEA), N,N-dimethylaminoethyl methacrylate (DMAEMA), N,N-diethylaminoethyl methacrylate (DEAEMA), N,N-dimethylaminopropyl acrylamide (DMAPAA), N,N-dimethylaminopropyl methacrylamide (DMAPMAA) and diallyldimethyl ammonium chloride (DADMAC), which may be used alone or in a combination of two or more of these monomers.

According to an embodiment of the present invention, the binder according to the present invention is a cationic copolymer, as represented by Chemical Formula 2. That is to say, the binder according to the present invention is of a cationic type and may improve adhesion through polarization.

[Chemical Formula 2]

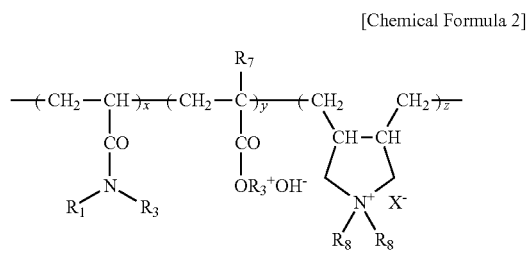

wherein $R_1$, $R_2$, $R_3$, $R_7$ and $R_8$ are defined as above.

According to an embodiment of the present invention, to prepare a cationic copolymer of the binder according to the present invention, $R_3$ is $-R_4NR_5R_6$. Here, $R_4$ is a substituted or unsubstituted C1-C10 alkylene group, or a substituted or unsubstituted C2-C10 alkenylene group; $R_5$ and $R_6$ are each independently a substituted or unsubstituted C1-C10 alkyl group, a substituted or unsubstituted C1-C10 alkenyl group, or a C5-C20 aryl group; $R_7$ is H or $CH_3$; $R_8$ is a substituted or unsubstituted C1-C3 alkyl group; and $X^-$ is an anionic counter ion, such as $OH^-$, $Cl^-$ or $Br^-$.

According to an embodiment of the present invention, in the copolymer of Chemical Formula 1 of the binder according to the present invention, x and (y+z) are in a range of 95-60 wt % and in a range of 40-5 wt %, respectively, and a ratio of y to z is in a range of 100:0 to 0:100, for example, 30:70 to 70:30.

In one embodiment, if y+z is less than 5 wt % based on the total weight of the copolymer, the effect of increased adhesion is not noticeable. In another embodiment, if y+z is greater than 40 wt % based on the total weight of the copolymer, charge and discharge characteristics are not greatly improved due to a reduction in the molecular weight of the binder.

Any suitable polymerization process known in the art may be used to prepare the binder. For example, in order to prepare the binder according to the present invention, radical polymerization may be used.

A polar solvent, such as water, alcohol or dimethylformamide, may be used as a polymerization solvent.

Polymerization in an aqueous solution may be performed to prevent (or reduce the likelihood of) a volatile organic compound from being generated when drying the resultant electrode slurry. The polymerization may be initiated by heat or a redox initiation process. For example, a general free-radical initiator (such as hydroperoxide, benzoyl peroxide, t-butyl hydroperoxide, ammonium or alkali persulfate) may be used as the initiator, and it may be used as a reducing agent. A low-level ionized salt (such as sulfites, for example, hydrogen sulfite, iron sulfite, copper sulfite or cobalt sulfite, an organic amine such as N,N,N',N'-tetra methylethylenediamine or aniline, and a reducing sugar such as aldose or ketose) may be used as the reducing agent. The initiator is generally contained in an amount in a range of 0.05 to 3.0 wt % based on the total weight of monomer used. In a case of a single initiator, the polymerization temperature is in a range of 40 to 90° C. The polymerization temperature of a redox initiator is lower than that of the single initiator, for example, in a range of 10 to 50° C. The polymerization time is not particularly limited but may be in a range of 1 to 10 hours.

The weight average molecular weight of the binder (e.g., the water-based binder) may be adjusted by addition of a chain transfer agent, such as, for example, a C1-C12 alkyl or functional alkyl mercaptan, or a crosslinking agent. In the water-based binder according to the present invention, the viscosity and adhesion of the binder may vary according to the molecular weight. Accordingly, the weight average molecular weight of the water-based binder may be adjusted to be in a range of 300,000 to 1,000,000 in consideration of workability of preparing an electrode slurry using the water-based binder and achieving suitable adhesion to a current collector. In one embodiment, the weight average molecular weight of the water-based binder is in a range of 300,000 to 700,000.

In more detail, alpha-methyl styrene dimer (AMSD), 2-mercapto ethanol, 1,6-mercaptomethyl-2-methyl-2-octanol, 2-phenyl-1-mercapto-2-ethanol, N-dodecyl mercaptan (N-DM), t-dodecyl mercaptan (t-DM), 3-mercapto-propionic acid (3-MPA), N-methylene bisacrylamide, diethylene glycol diacrylate, triethylene glycol triacrylate, tripropylene triacrylate, 1,6-hexanedioldiacrylate, and trimethylpropane triacrylate, and may be used in an amount in a range of 0.2 to 3 wt % based on the total weight of the monomer used.

According to an embodiment of the present invention, the copolymer of Chemical Formula 1 has a weight average molecular weight in a range of 300,000 to 700,000. In one embodiment, if the weight average molecular weight is less than 300,000, the adhesion is reduced, so that charge and discharge characteristics are not greatly improved. In another embodiment, if the weight average molecular weight is less than 700,000, gelation is likely to occur during polymerization.

The binder according to the present invention may also be used in combination with another binder such as styrene butadiene rubber (SBR) or carboxylmethylcellulose (CMC). Here, the binder according to the present invention may be contained in an amount of 1 wt % or greater based on the total weight of the electrode active material. In addition, the binder according to the present invention may further include additional functional additives such as epoxy resin, oxirane triazines, polyvalent metal salts, amino formaldehyde resins or isocyanates, to induce cross-linkage between the carboxyl functional group or hydroxy functional group in the binder to increase the bonding between polymer chains.

<Other Additives>

A composition of the binder according to the present invention may further include additives in addition to the soluble polymer binder.

Examples of the additives may include a dispersing agent, a thickening agent, a conductive agent, a filler and so on.

When a slurry for forming an electrode is prepared, the respective additives may be used after being pre-mixed with a binder composition for forming the electrode, or may be independently used after being separately prepared.

Components (or composition) of the additives to be used are determined by the active material and binder components, and, in some embodiments, the additives may not be used.

The content (or amount) of the additives may vary according to the kind of the active material, the components of the binder and the kind of additive used. The additive may be used in an amount in a range of 0.1 to 10 wt % based on the weight of the binder composition, excluding a solvent. If the content (or amount) of the additive is less than 0.1 wt %, the effect of the additive used is not sufficiently demonstrated or measured. If the content of the additive is greater than 10 wt %, a proportion (or ratio) of the content (or amount) of the additive to that of the binder composition for forming a negative electrode is reduced, so that it is difficult to attain desired characteristics.

The dispersing agent may be selected among materials for improving dispersibility of the positive or negative electrode active materials and the conductive agent in the slurry to be used. The dispersing agent may be selected from cationic, anionic, or nonionic dispersing agents. For example, the dispersing agent may be at least one selected among compounds having a lipophilic component including a C5-C20 hydrocarbon, an acryl oligomer, an ethylene oxide and propylene oxide oligomer, or a urethane oligomer.

The thickening agent may be added to raise the viscosity of the slurry (e.g., when the viscosity of the slurry is low), thereby facilitating a coating process of the slurry on a current collector. Examples of the thickening agent may include at least one selected from the group consisting of carboxymethyl cellulose, carboxyethyl cellulose, ethyl cellulose, hydroxymethyl cellulose, hydroxyethyl cellulose, hydroxypropyl cellulose, and polyvinyl alcohol.

However, in some embodiments, the dispersing agent and the thickening agent are used in small amounts only when necessary, because they may be mostly thermally decomposed at a vacuum drying temperature in a range from 250 to 450° C. and then be removed.

In some embodiments, the conductive agent is used to further improve a conductive path of an electrode. The conductive agent may be used to impart conductivity to the electrode, and any suitable electrically conductive material that does not induce a chemical change in batteries may be used. Examples of the conductive agent may include at least one conductive material, such as natural graphite, artificial graphite, carbon black, acetylene black, ketchen black (or ketjen black), carbon fiber, and the like, and metal powder, such as copper (Cu), nickel (Ni), aluminum (Al), silver (Ag), and the like.

The filler is a supplementary ingredient that may inhibit (or reduce) electrode expansion by improving the strength of the binder, and examples thereof may include at least one fibrous material, such as a glass fiber, a carbon fiber or a metal fiber.

<Electrode>

The electrode according to the present invention includes an electrode active material and the binder according to the present invention. In more detail, the electrode according to the present invention is formed by coating an electrode slurry including the electrode active material, the binder and a solvent mixed therein, and, if necessary, further including a conductive agent, on an electrode current collector to a predetermined (or preset) thickness, drying and compressing the same.

According to an embodiment of the present invention, the binder according to the present invention is used in preparing a negative electrode.

According to an embodiment of the present invention, any negative electrode active material that is capable of intercalating and deintercalating lithium ions can be used as the negative electrode active material used in preparing the negative electrode.

The negative electrode active material may include one or more material selected from the group consisting of compounds that can reversibly intercalate and deintercalate lithium ions, metals being capable of alloying with lithium, and combinations thereof. The materials that can reversibly intercalate and deintercalate lithium ions may include at least one selected from the group consisting of artificial graphite, natural graphite, graphitized carbon fiber, graphitized mesocarbon microbeads, fullerene, amorphous carbon, and so on.

The amorphous carbon may be a hard carbon, cokes, or a soft carbon obtained by firing at a temperature of 1500° C. or below, such as mesocarbon microbead (MCMB) or mesophase pitch-based carbon fiber (MPCF). In addition, examples of suitable metals being capable of alloying with lithium include at least one metal selected from the group consisting of aluminum (Al), silicon (Si), tin (Sn), lead (Pb), zinc (Zn), bismuth (Bi), indium (In), magnesium (Mg), gallium (Ga), cadmium (Cd), and germanium (Ge), which may be used alone or in combination. In addition, the metals may be used in combination with carbonaceous materials.

According to an embodiment of the present invention, the negative electrode active material is a Si-based negative electrode active material. The Si-based negative electrode active material may ensure a high capacity but may adversely affect the adhesion of the binder due to excessive expansion during charge and discharge cycles, thereby lowering cycle life characteristics of the battery. However, this disadvantage can be overcome by using the binder according to the present invention. Accordingly, the use of the binder according to the present invention may provide a rechargeable battery with a high capacity and excellent cycle life characteristics.

The Si-based negative electrode active material may include one or more elements based on SiOx ($0 \leq x < 2$) or Si, the one or more elements selected from the group consisting of Group 2A, 3A and 4A elements and transition metals. In some embodiments, the elements are at least one of Sn, Al, Pb, In, Ni, Co, Ag, Mn, Cu, Ge, Cr, Ti and Fe, for example, at least one of Ni and Ti, and, as another example, Ni and Ti.

In some embodiments, the Si-based metal alloy including Ni and Ti is present in an amount in a range of 55 to 85 at % based on the total weight of the metal alloy, because the Si-based metal alloy may be used as a Si-based active material and provide sufficiently high charge and discharge capacity when it is used within this range.

According to an embodiment of the present invention, when the Si metal alloy is a Si:Ni:Ti alloy, the metal elements are contained in a ratio of 16:17:17 at %. Within this ratio, excellent capacity and cycle life characteristics are demonstrated or observed.

The metal alloy may be prepared by well known processes in the related art, including, for example, melting spinning (or melt spinning), atomizing, mechanically alloying, and so on.

Non-limiting examples of the negative electrode current collector may include a punching metal, an X-punching metal, gold foil, a metal foam, a net metal fiber sinter, a nickel foil, a copper foil, and so on.

According to an embodiment of the present invention, the compounds that can reversibly intercalate and deintercalate lithium ions, which are referred to as lithiated intercalation compounds, may be used as the positive electrode active material for forming the positive electrode according to the present invention. In more detail, the lithiated intercalation compound used in the present invention may be at least one composite oxide of a metal selected from cobalt (Co), nickel (Ni) and a combination thereof and lithium. For example, the lithiated intercalation compound used in the present invention may include a compound represented by the following Chemical Formulas: $Li_aA_{1-b}X_bD_2$ ($0.90 \leq a \leq 1.8$, $0 \leq b \leq 0.5$); $Li_aE_{1-b}X_bO_{2-c}D_c$ ($0.90 \leq a \leq 1.8$, $0 \leq b \leq 0.5$, $0 \leq c \leq 0.05$); $LiE_{2-b}X_bD_4$ ($0 \leq b \leq 0.5$); $LiE_{2-b}X_bO_{4-c}D_c$ ($0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMnG_bO_2$ ($0.90 \leq a \leq 1.8$, $0.001 \leq b \leq 0.1$); $Li_aMn_2G_bO_2$ ($0.90 \leq a \leq 1.8$, $0.001 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$ In the above formulae, A is selected from the group consisting of Ni, Co, Mn, and combinations thereof; X is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; T is selected from the group consisting of F, S, P, and combinations thereof; G is selected from the group consisting of Al, Cr, Mn, Fe, Mg, La, Ce, Sr, V, and combinations thereof; Q is selected from the group consisting of Ti, Mo, Mn, and combinations thereof; Z is selected from the group consisting of Cr, V, Fe, Sc, Y, and combinations thereof; and J is selected from the group consisting of V, Cr, Mn, Co, Ni, Cu, and combinations thereof.

The compound may have a coating layer on the surface, or may be mixed with another compound having a coating layer. The coating layer may include at least one coating element compound selected from the group consisting of an oxide of the coating element, a hydroxide of the coating element, an oxyhydroxide of the coating element, an oxycarbonate of the coating element, and a hydroxylcarbonate of the coating element. The compound for the coating layer (the coating element compound) may be amorphous or crystalline. The coating element included in the coating layer may include Mg, Al, Co, K, Na, Ca, Si, Ti, V, Sn, Ge, Ga, B, As, Zr, or mixtures thereof. The coating layer may be formed using a method having no adverse influence on properties of a positive active material. For example, the method may include any suitable coating method such as spray coating, dipping, and the like, but is not illustrated in more detail since it is well-known to those of ordinary skill in the art.

The electrode current collector may be selected from the group consisting of a metal such as aluminum, copper, nickel, silver or stainless steel, and alloys thereof. In general, aluminum or an aluminum alloy may be used as the electrode current collector. The electrode current collector may be generally formed to a thickness in a range of 3 to 500 μm.

The binder according to the present invention may be used alone or in combination with another binder to form the negative or positive electrode, and the other binder may be any material that improves properties of binding positive active material particles among one another and binding the positive active material with a current collector. Examples of the other binder include polyvinyl alcohol, carboxylmethyl cellulose, hydroxypropyl cellulose, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. In particular, in some embodiments, polyvinylidene fluoride is used as the other binder.

The solvent may include a nonaqueous solvent or an aqueous solvent. Examples of the nonaqueous solvent may include N-methylpyrrolidone (NMP), dimethylformamide, dimethylacetamide, N,N-dimethylaminopropylamine, ethyleneoxide, tetrahydrofuran, and the like. The aqueous solvent may include water.

The conductive agent is used to impart conductivity to an electrode. It may include any suitable electrically conductive material, unless it causes a chemical change, and may be added in an amount in a range of 1 to 30 wt % based on the total weight of the electrode slurry. Examples of the conductive material include a carbon-based material or carbon nanotube (CNT), such as natural graphite, artificial graphite, carbon black, acetylene black, ketchen black (or ketjen black), a carbon fiber, and the like; a metal-based material such as a metal powder, a metal fiber, or the like that includes copper, nickel, aluminum, silver, and the like; a conductive polymer such as a polyphenylene derivative; or mixtures thereof.

The negative electrode or the positive electrode may further include a filler or a viscosity modifier.

The filler is an auxiliary agent for suppressing expansion of the electrode and any fibrous material may be used, unless it causes a chemical change to the battery. Examples of the filler may include olefin-based polymers such as polyethylene or polypropylene, and fibrous materials such as a glass fiber, a carbon fiber or a metal fiber.

The viscosity modifier may be used to control the viscosity of the electrode slurry to facilitate mixing of the electrode slurry and coating of the slurry on the current collector, and may be added in an amount of 30 wt % or less based on the total weight of the electrode slurry. Examples of the viscosity modifier may include carboxymethylcellulose, polyvinylidene fluoride, but are not limited thereto. In some embodiments, the solvent used in preparing the positive electrode slurry may also serve as the viscosity modifier.

<Lithium Rechargeable Battery>

The present invention provides a lithium rechargeable battery including a negative electrode, a positive electrode, a separator interposed between the negative electrode and the positive electrode, and an electrolyte.

The separator prevents (or reduces the likelihood of) a short circuit between the positive electrode and the negative electrode and provides a passageway for lithium ions. A polyolefin-based polymer film, such as polypropylene, polyethylene, polyethylene/polypropylene, polyethylene/polypropylene/polyethylene, polypropylene/polyethylene/polypropylene, or a multilayered film thereof, a microporous film or nonwoven fabric may be used as the separator.

In addition, a film formed by coating a highly stable resin on the microporous polyolefin film may also be used as the separator. When a solid electrolyte such as a polymer is used as the electrolyte, it may also serve as the separator.

The electrolyte may include a lithium salt and a nonaqueous organic solvent, and may further include additives for improving charge and discharge characteristics or preventing (or reducing) overcharge.

The lithium salt plays a role of supplying lithium ions in a battery and operating a basic operation of the rechargeable lithium battery. The nonaqueous organic solvent serves as a medium that allows lithium ions participating in electrochemical reactions of the battery to move between positive and negative electrodes therein.

Non-limiting examples of the lithium salt include at least one salt selected from $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_4$, $LiAlCl_4$, LiCl and LiI. The lithium salt may be used in a concentration in a range of about 0.6 M to about 2.0 M, for example, in a range of about 0.7 M to about 1.6 M. When the concentration of the lithium salt is less than 0.6 M, electrolyte conductivity may be lowered, resulting in deterioration of electrolyte performance. When the concentration of the lithium salt is greater than 2.0 M, electrolyte viscosity may increase, resulting in a reduction of lithium ion mobility.

The nonaqueous organic solvent may include carbonates, esters, ethers or ketones, which may be used alone or in combination. Examples of the carbonates may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, examples of the esters may include γ-butyrolactone (GBL), n-methyl acetate, n-ethyl acetate, n-propyl acetate, and the like, and examples of the ethers may include dibutyl ether, and the like, but are not limited thereto.

Among the nonaqueous organic solvents, the carbonate-based solvent may be prepared by mixing a cyclic carbonate and a chain carbonate. In some embodiments, the cyclic carbonate and the chain carbonate are mixed together in a volume ratio in a range of about 1:1 to about 1:9. When the mixture is used as an electrolyte, the electrolyte performance may be enhanced.

In addition, the non-aqueous organic electrolyte may be further prepared by mixing a carbonate-based solvent with an aromatic hydrocarbon-based solvent. Examples of the aromatic hydrocarbon-based organic solvent may include, but are not limited to, at least one selected from benzene, fluorobenzene, bromobenzene, chlorobenzene, cyclohexylbenzene, isopropylbenzene, n-butylbenzene, octylbenzene, toluene, xylene, mesitylene, and the like, which may be used alone or in combination.

In the electrolyte including the carbonate solvent and the aromatic hydrocarbon-based organic solvent, the carbonate solvent and the aromatic hydrocarbon-based organic solvent may be mixed together in a volume ratio in a range of about 1:1 to about 30:1. Within this range, desired electrolyte performance may be demonstrated.

Hereinafter, a rechargeable battery including an electrode prepared according to one embodiment of the present invention will be described in more detail.

The accompanying drawing is a partially cross-sectional view of a lithium rechargeable battery according to an embodiment of the present invention.

The following examples are provided for a better understanding of the present invention, and technical details known in the related art may be used as reference to appropriately modify embodiments of the present invention.

Referring to the drawing, the lithium rechargeable battery according to an embodiment of the present invention includes a can 10, an electrode assembly 20, a cap assembly 30 and an electrolyte. The lithium rechargeable battery is fabricated by accommodating the electrode assembly 20 and the electrolyte in the can 10 and sealing a top end of the can 10 by the cap assembly 30.

The cap assembly 30 may include a cap plate 40, an insulation plate 50, a terminal plate 60 and an electrode terminal 80. The cap assembly 30 is coupled to an insulation case 70 to seal the can 10.

The electrode terminal 80 is inserted into a terminal hole 41 centrally formed in the cap plate 40. When the electrode terminal 80 is inserted into the terminal hole 41, a tubular gasket 46 is coupled to an outer surface of the electrode terminal 80 to then be inserted into the terminal hole 41. Therefore, the electrode terminal 80 is electrically insulated from the cap plate 40.

The electrolyte is injected into the can 10 through an electrolyte injection hole 42 after the cap assembly 30 is assembled to the top end of the can 10. The electrolyte injection hole 42 is closed by a separate plug 43. The electrode terminal 80 is connected to a negative electrode tab 17 of the negative electrode 23 or a positive electrode tab 16 of the positive electrode 21 to function as a negative electrode terminal or a positive electrode terminal. A separator 22 is between the negative electrode 23 and the positive electrode 21.

The rechargeable battery including the electrode prepared according to one embodiment of the present invention may be fabricated in a cylindrical shape or a pouch shape as well as a prismatic shape illustrated herein.

The following examples illustrate the present invention in more detail. These examples, however, are not to be interpreted as limiting the scope of this disclosure.

Preparation Example 1

To a 2 L reaction vessel equipped with a heater, a cooler and a stirrer were added 700 g of deionized (DI) water and 24 g of acrylamide, followed by heating the reaction vessel at 70° C. under a nitrogen atmosphere. After 5 g of 15% NaOH aqueous solution was injected into the reaction vessel, a solution obtained by dissolving 0.7 g of ammonium persulfate in 10 g of DI water was added thereto. After the reaction was maintained for 20 minutes, the reaction temperature was raised to 80° C., a mixed solution containing 112.8 g of acrylamide and 15.2 g of acrylic acid dissolved in 95 g of DI water was added dropwise to the resultant reactant for 2 hours. After the reaction was maintained for 1 hour, the resultant product was cooled to 40° C. or less and packaged, yielding a binder having a solid matter content of 15.0%, pH of 5.3, and viscosity of 4,900 cps.

Preparation Example 2

To a 2 L reaction vessel equipped with a heater, a cooler and a stirrer were added 700 g of deionized (DI) water and 47.8 g of acrylamide, followed by heating the reaction vessel at 70° C. under a nitrogen atmosphere. A solution obtained by dissolving 0.7 g of ammonium persulfate in 10 g of DI water was added to the reaction vessel. After the reaction was maintained for 20 minutes, the reaction temperature was raised to 80° C., a mixed solution containing 88.1 g of acrylamide and 7.1 g of N,N-dimethylaminoethyl methacrylate dissolved in 95 g of DI water was added dropwise to the resultant reactant for 2 hours. After the reaction was maintained for 1 hour, the resultant product was cooled to 40° C. or less and packaged, yielding a binder having a solid matter content of 15.6%, pH of 5.8, and viscosity of 12,450 cps.

Preparation Example 3

To a 2 L reaction vessel equipped with a heater, a cooler and a stirrer were added 700 g of deionized (DI) water and 47.8 g of acrylamide, followed by heating the reaction vessel at 70° C. under a nitrogen atmosphere. A solution obtained by dissolving 0.7 g of ammonium persulfate in 10 g of DI water was added to the reaction vessel. After the reaction was maintained for 20 minutes, the reaction temperature was raised to 80° C., a mixed solution containing 88.1 g of acrylamide and 9.56 g of diallyldimethyl ammonium chloride dissolved in 95 g of DI water was added dropwise to the resultant reactant for 2 hours. After the reaction was maintained for 1 hour, the resultant product was cooled to 40° C. or less and packaged, yielding a binder having a solid matter content of 15.0%, pH of 4.1, and viscosity of 1,150 cps.

Preparation Example 4

To a 2 L reaction vessel equipped with a heater, a cooler and a stirrer were added 700 g of deionized (DI) water and 24 g of acrylamide, followed by heating the reaction vessel at 70° C. under a nitrogen atmosphere. After 5 g of 15% NaOH aqueous solution was injected into the reaction vessel, a solution obtained by dissolving 0.7 g of ammonium persulfate in 10 g of DI water was added to the reaction vessel. After the reaction was maintained for 20 minutes, the reaction temperature was raised to 80° C., a mixed solution containing 82.5 g of acrylamide and 32 g of acrylic acid dissolved in 95 g of DI water was added dropwise to the resultant reactant for 2 hours. After the reaction was maintained for 1 hour, the resultant product was cooled to 40° C. or less, a solution obtained by dissolving 10.7 g of lithium hydroxide in 40 g of DI water was slowly added dropwise, followed by packaging, yielding a binder having a solid matter content of 14.5%, pH of 6.3, and viscosity of 1,130 cps.

Preparation Example 5

To a 2 L reaction vessel equipped with a heater, a cooler and a stirrer were added 700 g of deionized (DI) water and 24 g of acrylamide, followed by heating the reaction vessel at 70° C. under a nitrogen atmosphere. After 5 g of 15% NaOH aqueous solution was injected into the reaction vessel, a solution obtained by dissolving 0.7 g of ammonium persulfate in 10 g of DI water was added to the reaction vessel. After the reaction was maintained for 20 minutes, the reaction temperature was raised to 80° C., a mixed solution containing 82.5 g of acrylamide, 22.4 g of diallyldimethyl ammonium chloride and 9.6 g of N,N-dimethylaminoethyl methacrylate dissolved in 95 g of DI water was added dropwise to the resultant reactant for 2 hours. After the reaction was maintained for 1 hour, the resultant product was cooled to 40° C. or less and packaged, yielding a binder having a solid matter content of 15.2%, pH of 4.5, and viscosity of 3,560 cps.

Preparation Example 6

To a 2 L reaction vessel equipped with a heater, a cooler and a stirrer were added 700 g of deionized (DI) water and 24 g of acrylamide, followed by heating the reaction vessel at 70° C. under a nitrogen atmosphere. After 5 g of 15% NaOH aqueous solution was injected into the reaction vessel, a solution obtained by dissolving 0.7 g of ammonium persulfate in 10 g of DI water was added to the reaction vessel. After the reaction was maintained for 20 minutes, the reaction temperature was raised to 80° C., a mixed solution containing 82.5 g of acrylamide, 9.6 g of diallyldimethyl ammonium chloride and 22.4 g of N,N-dimethylaminoethyl methacrylate dissolved in 95 g of DI water was added dropwise to the resultant reactant for 2 hours. After the reaction was maintained for 1 hour, the resultant product was cooled to 40° C. or less and packaged, yielding a binder having a solid matter content of 15.0%, pH of 4.8, and viscosity of 4,630 cps.

Experimental Example 1

Measurement of Physical Properties

Various physical properties of the binders prepared in Preparation Examples 1 to 4 were analyzed using the following measuring devices. The measurement results are listed in Table 1.

Molecular weight: GPC (Gel Permeation Chromatography) (LC-10A instrument manufactured by Shimadzu, Japan)

TABLE 1

| | Molecular weight | | Weight % | |
|---|---|---|---|---|
| | Mn | Mw | x:(y + z) | y:z |
| Preparation Example 1 | 410,000 | 482,000 | 90:10 | 100:0 |
| Preparation Example 2 | 495,000 | 560,000 | 95:5 | 100:0 |
| Preparation Example 3 | 453,000 | 532,000 | 93.4:6.6 | 0:100 |
| Preparation Example 4 | 430,000 | 495,000 | 77:23 | 100:0 |
| Preparation Example 5 | 440,000 | 510,000 | 77:23 | 30:70 |
| Preparation Example 6 | 485,000 | 542,000 | 77:23 | 70:30 |

Comparative Example 1

86 g of graphite (MC08 manufactured by Mitsubishi Chemical, Japan) as negative electrode active materials, 5 g of SBR (Styrene butadiene Rubber) and 5 g of CMC (carboxymethylcellose) as binders, and 4 g of denka black as a conductive agent were dispersed in water as a solvent to have a solid matter content of about 45%, thereby preparing a negative electrode slurry.

The negative electrode slurry was coated on a copper (Cu) foil and then dried to have a thickness of 111 μm, and compressed to prepare a 56 μm thick negative electrode.

The prepared negative electrode was cut in a shape of a coin having a diameter of 16 mm. A lithium rechargeable battery was manufactured using the negative electrode, a polypropylene separator, lithium metal as a counter electrode and an electrolyte prepared by dissolving 1.5 mol/L of $LiPF_6$ in a mixed solution of ethylene carbonate (EC), fluoroethylene carbonate (FEC) and diethyl carbonate (DEC) in a volume ratio of 5:75:20.

Comparative Example 2

A lithium rechargeable battery was manufactured in substantially the same manner as in Comparative Example 1, except that 8.6 g of an active material prepared using a Si-based metal alloy of Si:Ni:Ti in a ratio of 68:16:16 was mixed with 77.4 g of a mixture containing a first graphite (MC08 manufactured by Mitsubishi Chemical, Japan) and a second graphite (SD 13 manufactured by Showa Denko, Japan) mixed in a weight ratio of 1:1, and then used as a negative electrode active material.

Comparative Example 3

A lithium rechargeable battery was manufactured in substantially the same manner as in Comparative Example 1, except that 17.2 g of an active material prepared using a Si-based metal alloy of Si:Ni:Ti in a ratio of 68:16:16 was mixed with 68.8 g of a mixture containing a first graphite (MC08 manufactured by Mitsubishi Chemical, Japan) and a second graphite (SD 13 manufactured by Showa Denko, Japan) mixed in a weight ratio of 1:1, and then used as a negative electrode active material.

Comparative Example 4

A lithium rechargeable battery was manufactured in substantially the same manner as in Comparative Example 3, except that 10% PAI (Polyamide Imide) using a nonaqueous solvent NMP was used as a binder, and the resultant product was dried at 100° C., followed by performing heat treatment at 350° C. for 2 hours.

Example 1

A lithium rechargeable battery was manufactured in substantially the same manner as in Comparative Example 2, except that 10 g of a polymer of Chemical Formula 3 prepared in Preparation Example 1 was used in place of the SBR and CMC binders:

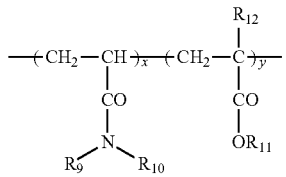

[Chemical Formula 3]

wherein $R_9$, $R_{10}$, $R_{11}$, and $R_{12}$ are H, and a ratio of x to y is 90:10.

Example 2

A lithium rechargeable battery was manufactured in substantially the same manner as in Comparative Example 3, except that 10 g of a polymer of Chemical Formula 3 prepared in Preparation Example 1 was used in place of the SBR and CMC binders.

Example 3

A lithium rechargeable battery was manufactured in substantially the same manner as in Comparative Example 2, except that the polymer of Chemical Formula 4 prepared in Preparation Example 2 was used in place of the SBR and CMC binders:

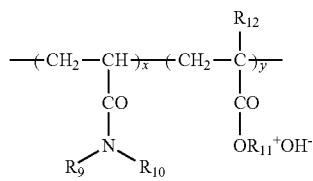

[Chemical Formula 4]

wherein each of $R_9$ and $R_1$ is H, $R_{11}$ is $CH_2CH_2N(CH_3)_2$, $R_{12}$ is $CH_3$, and a ratio of x to y is 95:5.

Example 4

A lithium rechargeable battery was manufactured in substantially the same manner as in Comparative Example 3, except that 10 g of a polymer of Chemical Formula 4 prepared in Preparation Example 2 was used in place of the SBR and CMC binders.

Example 5

A lithium rechargeable battery was manufactured in substantially the same manner as in Comparative Example 2, except that the polymer of Chemical Formula 5 prepared in Preparation Example 3 was used in place of the SBR and CMC binders:

[Chemical Formula 5]

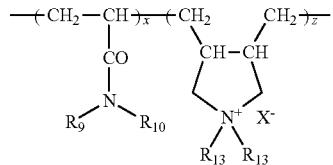

wherein each of $R_9$ and $R_{10}$ is H, $R_{13}$ is $CH_3$, X is Cl, and a ratio of x to z is 93.4:6.6.

Example 6

A lithium rechargeable battery was manufactured in substantially the same manner as in Comparative Example 3, except that 10 g of a polymer of Chemical Formula 5 prepared in Preparation Example 3 was in place of the SBR and CMC binders.

Example 7

A lithium rechargeable battery was manufactured in substantially the same manner as in Comparative Example 2, except that the polymer of Chemical Formula 6 prepared in Preparation Example 4 was used in place of the SBR and CMC binders:

[Chemical Formula 6]

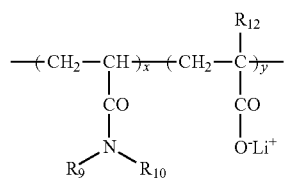

wherein each of $R_9$, $R_{10}$, and $R_{12}$ is H and, a ratio of x to y is 77:23.

Example 8

A lithium rechargeable battery was manufactured in substantially the same manner as in Comparative Example 3, except that the polymer prepared in Preparation Example 4 was used in place of the SBR and CMC binders.

Example 9

A lithium rechargeable battery was manufactured in substantially the same manner as in Comparative Example 2, except that the polymer of Chemical Formula 7 prepared in Preparation Example 5 was used in place of the SBR and CMC binders:

[Chemical Formula 7]

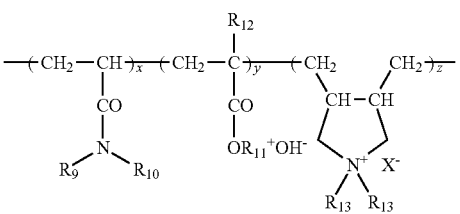

wherein each of $R_9$ and $R_{10}$ is H, $R_{11}$ is $CH_2CH_2N(CH_3)_2$, each of $R_{12}$, and $R_{13}$ is $CH_3$, X is Cl, a ratio of x to (y+z) is 77:23, and a ratio of y to z is 30:70.

Example 10

A lithium rechargeable battery was manufactured in substantially the same manner as in Comparative Example 3, except that the polymer of Chemical Formula 7 prepared in Preparation Example 5 was used in place of the SBR and CMC binders.

Example 11

A lithium rechargeable battery was manufactured in substantially the same manner as in Comparative Example 2, except that the polymer of Chemical Formula 8 prepared in Preparation Example 6 was used in place of the SBR and CMC binders:

[Chemical Formula 8]

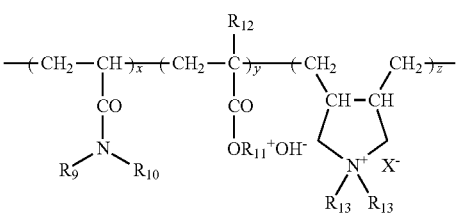

wherein each of $R_9$ and $R_{10}$ is H, $R_{11}$ is $CH_2CH_2N(CH_3)_2$, each of $R_{12}$, and $R_{13}$ is $CH_3$, X is Cl, a ratio of x to (y+z) is 77:23, and a ratio of y to z is 70:30.

Example 12

A lithium rechargeable battery was manufactured in substantially the same manner as in Comparative Example 3, except that the polymer of Chemical Formula 8 prepared in Preparation Example 6 was used in place of the SBR and CMC binders.

Experimental Example 1

Capacity Characteristics

The lithium rechargeable batteries manufactured in Comparative Example 4 and Examples 1-12 were charged and discharged under a constant current of 0.1 C to then measure the discharge capacity of each battery, and the measurement results are shown in Table 2.

Experimental Example 2

Retention Characteristics

Each of the lithium rechargeable batteries manufactured in Comparative Example 4 and Examples 1-12 was subjected to 50 cycle capacity tests under a constant current of 1 C. The capacity retention (%) at a 50th cycle relative to initial cycle capacity was measured and the results thereof are shown in Table 2.

Experimental Example 3

Initial Efficiency

Charge and discharge capacities of each of the lithium rechargeable batteries manufactured in Comparative Example 4 and Examples 1-12 were measured after repeated charge and discharge cycles under a constant current of 0.1 C. The discharge capacity (%) relative to the charge capacity was measured as an initial capacity and the results thereof are shown in Table 2.

Experimental Example 4

Adhesion

In order to evaluate adhesion properties of the negative electrodes of the lithium rechargeable batteries manufactured in Comparative Example 4 and Examples 1-12, a peeling-off test was performed such that each 10×25 mm sample was fixed to a glass plate and an end of the negative electrode was attached to a jig to then be lifted 15 mm at a speed of 100 mm/min, and the results thereof are shown in Table 2.

TABLE 2

|  | Discharge capacity (mAh/g) | Retention capacity)(%) @50 cycle | Initial efficiency (%) | Adhesion (gf/mm) |
|---|---|---|---|---|
| Comparative Example 4 | 310 | 72 | 77 | 3.4 |
| Example 1 | 390 | 87 | 92 | 3.6 |
| Example 2 | 444 | 83 | 91 | 2.8 |
| Example 3 | 386 | 89 | 91 | 4 |
| Example 4 | 439 | 82 | 90 | 3.2 |
| Example 5 | 384 | 91 | 93 | 4.2 |
| Example 6 | 441 | 86 | 91 | 3.4 |
| Example 7 | 385 | 88 | 92 | 3.6 |
| Example 8 | 432 | 84 | 90 | 3.1 |
| Example 9 | 387 | 90 | 91 | 3.4 |
| Example 10 | 428 | 88 | 89 | 2.9 |
| Example 11 | 388 | 92 | 92 | 4.1 |
| Example 12 | 436 | 90 | 90 | 3.7 |

As shown in Table 2, the lithium rechargeable battery using the binder according to the present invention prepared in Examples 1 to 12 demonstrated higher discharge capacity, retention rate and initial efficiency than the lithium rechargeable battery prepared in Comparative Example 4.

Meanwhile, the lithium rechargeable batteries prepared in Comparative Examples 1-3 demonstrated adhesion of 16 or greater, preventing charging and discharging from being performed when 10% of the binder was used, like in the present invention. The SBR binder has very high adhesion. If the binder is used in a large amount, the adhesion increases, so that it may function as an insulator in the battery. Therefore, electrochemical properties of battery cannot be demonstrated. By contrast, the binder according to the present invention satisfies electrochemical performance even when a high content of the binder is used in the battery, so that it can be advantageously used in high-capacity battery applications.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims and equivalents thereof.

What is claimed is:

1. A binder for an electrode of a rechargeable battery comprising a copolymer of Chemical Formula 1:

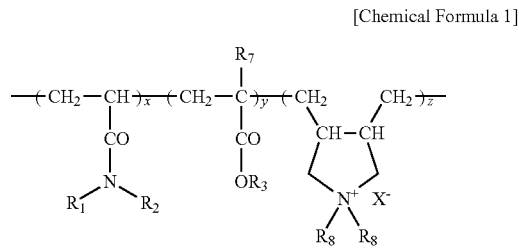

[Chemical Formula 1]

wherein $R_1$ and $R_2$ are each independently H, a substituted or unsubstituted C1-C10 alkyl group, a substituted or unsubstituted C1-C10 alkenyl group, a C5-C20 aryl group, and a C1-C10 alkylalcohol group; $R_3$ is H, a substituted or unsubstituted C1-C10 alkylcarboxylic group, its inorganic ion salt, or —$R_4NR_5R_6$, where $R_4$ is a substituted or unsubstituted C1-C10 alkylene group, or a substituted or unsubstituted C2-C10 alkenylene group; $R_5$ and $R_6$ are each independently a substituted or unsubstituted C1-C10 alkyl group, or a substituted or unsubstituted C1-C10 alkenyl group, or a C5-C20 aryl group; $R_7$ is H or $CH_3$; $R_8$ is a substituted or unsubstituted C1-C3 alkyl group; and $X^-$ is an anionic counter ion, such as $OH^-$, $Cl^-$ or $Br^-$, wherein x and (y+z) are in a range of 95-60 wt % and in a range of 40-5 wt %, respectively, and a ratio of y to z is in a range of 100:0 to 0:100.

2. The binder of claim 1, wherein the copolymer of Chemical Formula 1 has a weight average molecular weight in a range of 300,000 to 700,000.

3. The binder of claim 1, wherein a ratio of y to z is in a range of 30:70 to 70:30.

4. The binder of claim 3, wherein the copolymer of Chemical Formula 1 has a weight average molecular weight in a range of 300,000 to 700,000.

5. The binder of claim 1, wherein the copolymer of Chemical Formula 1 is a cationic copolymer of Chemical Formula 2:

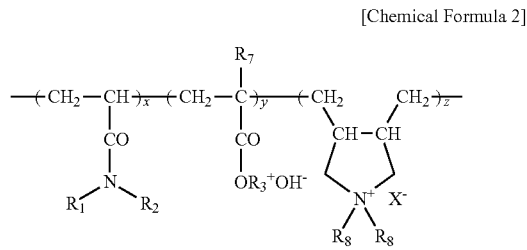

[Chemical Formula 2]

wherein $R_1$ and $R_2$ are each independently H, a substituted or unsubstituted C1-C10 alkyl group, a substituted or unsubstituted C1-C10 alkenyl group, a C5-C20 aryl group, and a C1-C10 alkylalcohol group; to prepare a cationic copolymer, $R_3$ is —$R_4NR_5R_6$, where $R_4$ is a substituted or unsubstituted C1-C10 alkylene group, or a substituted or unsubstituted C2-C10 alkenylene group; $R_5$ and $R_6$ are each independently a substituted or unsubstituted C1-C10 alkyl group, or a substituted or unsubstituted C1-C10 alkenyl group, or a C5-C20 aryl group; $R_7$ is H or $CH_3$; $R_8$ is a substituted or unsubstituted C1-C3 alkyl group; and $X^-$ is an anionic counter ion, such as $OH^-$, $Cl^-$ or $Br^-$.

6. The binder of claim 5, wherein the copolymer of Chemical Formula 1 has a weight average molecular weight in a range of 300,000 to 700,000.

7. The binder of claim 1, wherein $R_3$ is H, a substituted or unsubstituted C1-C10 alkylcarboxylic group, its inorganic ion salt, or —$R_4NR_5R_6$, where $R_4$ is H, a substituted or unsubstituted C1-C10 alkylene group, or a substituted or unsubstituted C2-C20 alkenylene group; $R_5$ and $R_6$ are each independently a substituted or unsubstituted C1-C10 alkyl group, or a substituted or unsubstituted C1-C10 alkenyl group, or a C5-C20 aryl group; $R_7$ is H or $CH_3$; $R_8$ is a substituted or unsubstituted C1-C3 alkyl group; and $X^-$ is an anionic counter ion, such as $OH^-$, $Cl^-$ or $Br^-$.

8. The binder of claim 7, wherein the copolymer of Chemical Formula 1 has a weight average molecular weight in a range of 300,000 to 700,000.

9. The binder of claim 1, wherein the inorganic ion salt is prepared using a hydroxide of an alkali metal.

10. The binder of claim 9, wherein the copolymer of Chemical Formula 1 has a weight average molecular weight in a range of 300,000 to 700,000.

11. The binder of claim 5, wherein the cationic copolymer is prepared from monomers selected from the group consisting of N,N-diethyl acrylamide (DEA), N,N-dimethylaminoethyl methacrylate (DMAEMA), N,N-diethylaminoethyl methacrylate (DEAEMA), N,N-dimethylaminopropyl acrylamide (DMAPAA), N,N-dimethylaminopropyl methacrylamide (DMAPMAA) and diallyldimethyl ammonium chloride (DADMAC), which are used alone or in combination of two or more of these monomers.

12. The binder of claim 11, wherein the copolymer of Chemical Formula 1 has a weight average molecular weight in a range of 300,000 to 700,000.

13. An electrode for a rechargeable battery, comprising:
a binder of claim 1;
an electrode active material; and
a solvent.

14. The electrode of claim 13, wherein the electrode active material is a Si-containing electrode active material.

15. The electrode of claim 14, wherein the Si-containing electrode active material is an Si:Ni:Ti alloy.

16. The electrode of claim 15, wherein the Si:Ni:Ti alloy includes Si, Ni and Ti in a ratio of 68:16:16.

17. The electrode of claim 13, wherein the binder is contained in an amount in a range of 3% to 50% based on the total weight of the electrode active material.

18. A rechargeable battery comprising:
a positive electrode;
a negative electrode; and
an electrolyte,
wherein the negative electrode is the electrode of claim 13.

19. An electrode for a rechargeable battery, comprising:
a binder of claim 2;
an electrode active material; and
a solvent.

20. An electrode for a rechargeable battery, comprising:
a binder of claim 3;
an electrode active material; and
a solvent.

* * * * *